Fig. 5
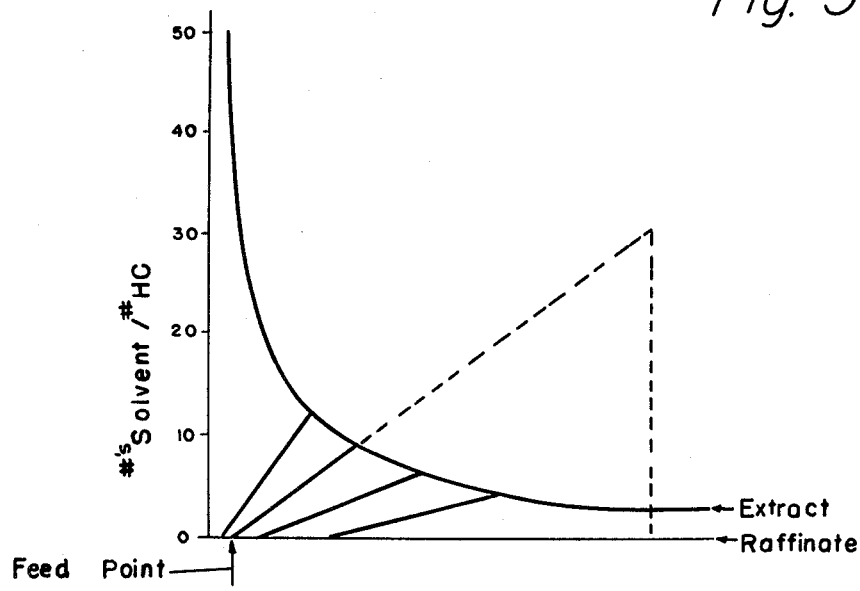
Feed Point
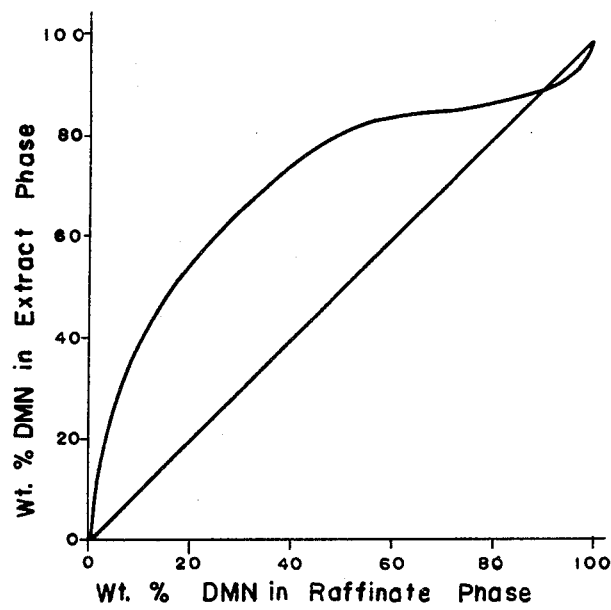

Fig. 7
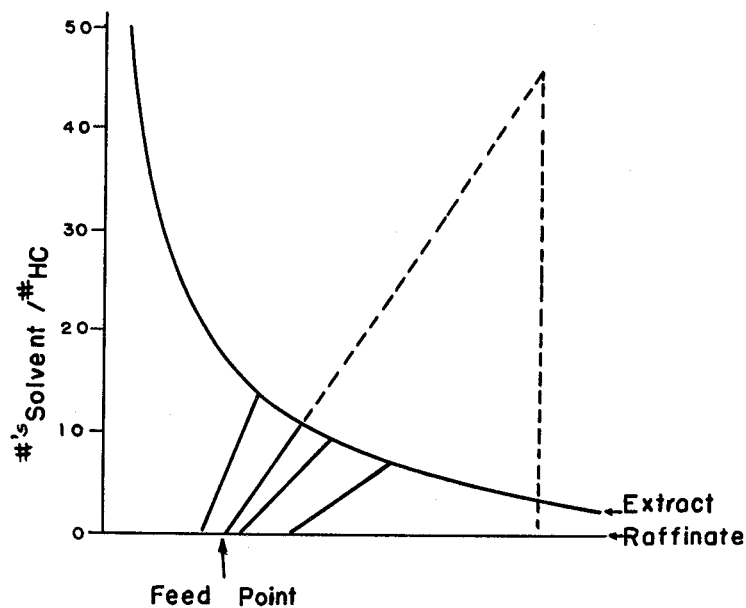
Feed Point
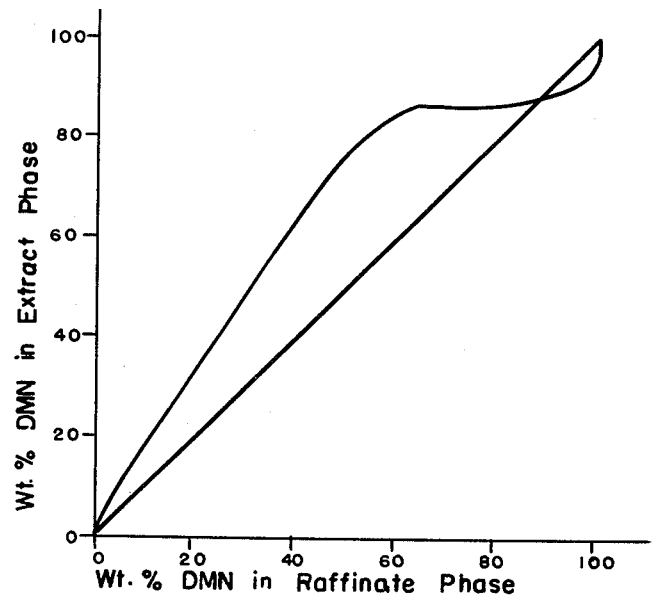

3,171,863
PROCESS FOR RECOVERING DIMETHYLNAPH-
THALENES FROM CRACKED GAS OIL BY
COMBINED SOLVENT EXTRACTION AND
AZEOTROPIC DISTILLATION
Raymond Wynkoop, Gladwyne, and Joseph G. Allen,
Ridley Park, Pa., assignors to Sun Oil Company, Philadelphia, Pa., a corporation of New Jersey
Filed July 17, 1961, Ser. No. 124,726
9 Claims. (Cl. 260—674)

This invention relates to a process for segregating petroleum hydrocarbon mixtures into relatively aromatic and relatively non-aromatic fractions. It particularly relates to a method for separating from such mixtures dimethylnaphthalene concentrates. It especially relates to a process for recovering 2,6- and 2,7-dimethylnaphthalene from cracked gas oil by combined solvent extraction and azeotropic distillation with diethylene glycol.

The synthetic fiber market has achieved significant importance in the commercial world. One of the more important materials from which such fibers are made is the polyester of 2,6-dicarboxynaphthalene. Therefore, it is an object of this invention to produce an aromatic concentrate which is rich in 2,6-dimethylnaphthalene which is an intermediate for preparing the diester monomer. Specifically, the principal object of this invention is to recover from cracked gas oil an aromatic concentrate composed almost entirely of 2,6- and 2,7-dimethylnaphthalene. The 2,6-isomer can be separated from the 2,7-isomer by, say, fractional crystallization. The process of this invention is economical and simple and it produces a dimethylnaphthalene concentrate from which the 2,6-isomer can be obtained in high purity.

The present invention is based on the discovery that under narrow conditions of temperature and solvent dosage the desired, say, 2,6- and 2,7-DMN's can be concentrated by, first, an extraction stage followed by an azeotropic distillation stage wherein both stages utilize a polyalkylene glycol such as diethylene glycol as the treating agent.

The charge material used in the present invention is obtained as a cracked gas oil fraction boiling in the range of 400° F. to 650° F. which contains alkyl naphthalene and dialkyl naphthalene constituents. Within this definition of starting material are included cracked gas oils as obtained directly from distillation of cracking products, such gas oils having an initial boiling point not substantially lower than 400° F. and a final boiling point not substantially higher than 650° F.; mixed aromatic concentrates obtained from such cracked gas oils and having a boiling range substantially the same as the starting cracked gas oil; and fractions separated from either of the above materials but which boil within the narrower range of 475° F. to 520° F., preferably between 480° F. and 515° F. As used herein, the term "cracked" includes thermal, catalytic, and reforming operations.

According to the present invention, the cracked petroleum fraction should contain substantial amounts of dicyclic aromatic compounds and preferably little if any tricyclic aromatic compounds. Since the pertoleum fraction can be derived from practically any source of crude petroleum, its specific composition can vary considerably. Even though the boiling range of the petroleum fraction can be between 400° F. and 650° F., it is preferred that the boiling range be substantially between 475° F. and 520° F., more preferably between 480° F. and 515° F. via distillation, so that a concentrate of such dicyclic compounds as dimethylnaphthalenes (DMN) can be obtained. Furthermore, according to this invention, the material (e.g. the extract) in contact with the solvent, described hereinafter, during the azeotropic distillation step should have total aromatic content of at least 40% by weight, preferably at least 60% by weight. In fact, best results are obtained if this material is 100% aromatic hydrocarbons. Further, the cracked fraction charged to the solvent extraction step should contain at least 2–3% by weight DMN's, preferably from 5% to 60% by weight DMN.

Additionally, suitable charge materials within the definition of "cracked gas oils" typically have an A.P.I. gravity at 60° F. between 12° and 40°; a refractive index at 20° C. of from 1.4500 to 1.5800; and a sulfur content of from 0.05% by weight to 3.0% by weight.

The solvents utilized in the present process are those which are selective for aromatics and which are selective azeotrope formers with dialkylnaphthalene. Suitable solvents are the polyalkylene glycols, including, for example diethylene glycol, triethylene glycol, tetraethylene glycol, dipropylene glycol, tripropylene glycol, and mixed ethylene glycol-propylene glycol ethers. The preferred solvent which is both an extracting agent and an azeotroping agent is diethylene glycol (DEG).

The selectivity of the solvent can be enhanced to a considerable extent by the addition thereto of small amounts of water. For example, certain limited amounts of water, say, up to 20%, and preferably up to 10% by weight of the solvent composition will enhance the selectivity of the solvent between dicyclic aromatic and non-aromatic hydrocarbons. It has also been found that at least 0.25% water is needed in the solvent to effectively cause the DMN's to azeotrope with the solvent.

According to the present invention the temperature during the extracting stage can vary between 240° F. and 320° F. but the preferable range is from 260° F. and 310° F. Actually,, the dimethylnaphthalenes can be best extracted by diethylene glycol at a temperature of 275° F. The DMN–DEG azeotrope can be recovered over a temperature range of 448° F. and 460° F. However, if the desired DMN's are 2,6- and 2,7-dimethylnaphthalenes; then the DMN–DEG azeotrope should be recovered over a temperature range of 451° F. to 454° F.

The solvent extraction step is performed by procedures known to those skilled in the art. For example, countercurrent extraction may be performed in a suitable column equipped with granular packing or equipped with a series of rotating discs. The solvent/feed ratios for extraction usually range from about 0.5 to 15 by volume. In addition, it has been found that the efficiency of aromatic extraction by the solvent can be enhanced by recycling as reflux a portion of the dimethylnaphthalene concentrate recovered from the azeotropic distillation step. The DMN concentrate which is recycled as reflux should enter the extraction zone at a locus intermediate the feed and the extract.

The azeotropic distillation is ordinarily conducted at atmospheric pressure, but elevated or reduced pressures may be employed if desired. The solvent dosage for azeotroping should be at least 3 parts solvent per 2 parts hydrocarbon. An excess of solvent is desirable. Suitable solvent/hydrocarbon ratios ordinarily vary between about 1 to 10 but this factor may be varied in order to azeotrope only the dimethylnaphthalenes. The preferred solvent/feed ratio range is 1.5 to 2.5:1.

Thus, the present invention provides a process for recovering a dimethylnaphthalene concentrate from cracked gas oil which comprises contacting at a temperature between 240° F. and 320° F. in an extraction zone cracked gas oil feed containing dimethylnaphthalene and boiling substantially within the range of 475–520° F. with a solvent which is selective for aromatics and which is a selective azeotrope former with dialkylnaphthalenes; separating a raffinate phase rich in non-aromatic hydrocarbons and an extract phase enriched in dimethylnaphthalenes; subjecting the extract phase to azeotropic distillation; removing an overhead fraction consisting essentially of dimethylnaphthalenes and solvent; recovering dimethylnaphthalenes from the solvent; and removing a bottoms fraction consisting essentially of solvents and aromatics which azeotrope above said dimethylnaphthalenes.

FIGURE 5 is a plot of solvent content vs. concentration for the ternary system of whole catalytic gas oil-dimethylnaphthalene-diethylene glycol. Also plotted as FIGURE 5 is a selectivity diagram for whole catalytic gas oil in this ternary system.

FIGURE 7 is a plot of solvent content vs. concentration for the ternary system of 480°–515° F. catalytic gas oil-dimethylnaphthalene-diethylene glycol. Also plotted as FIGURE 7 is a selectivity diagram for the 480°–515° F. catalytic gas oil fraction in this ternary system.

Figure 1:
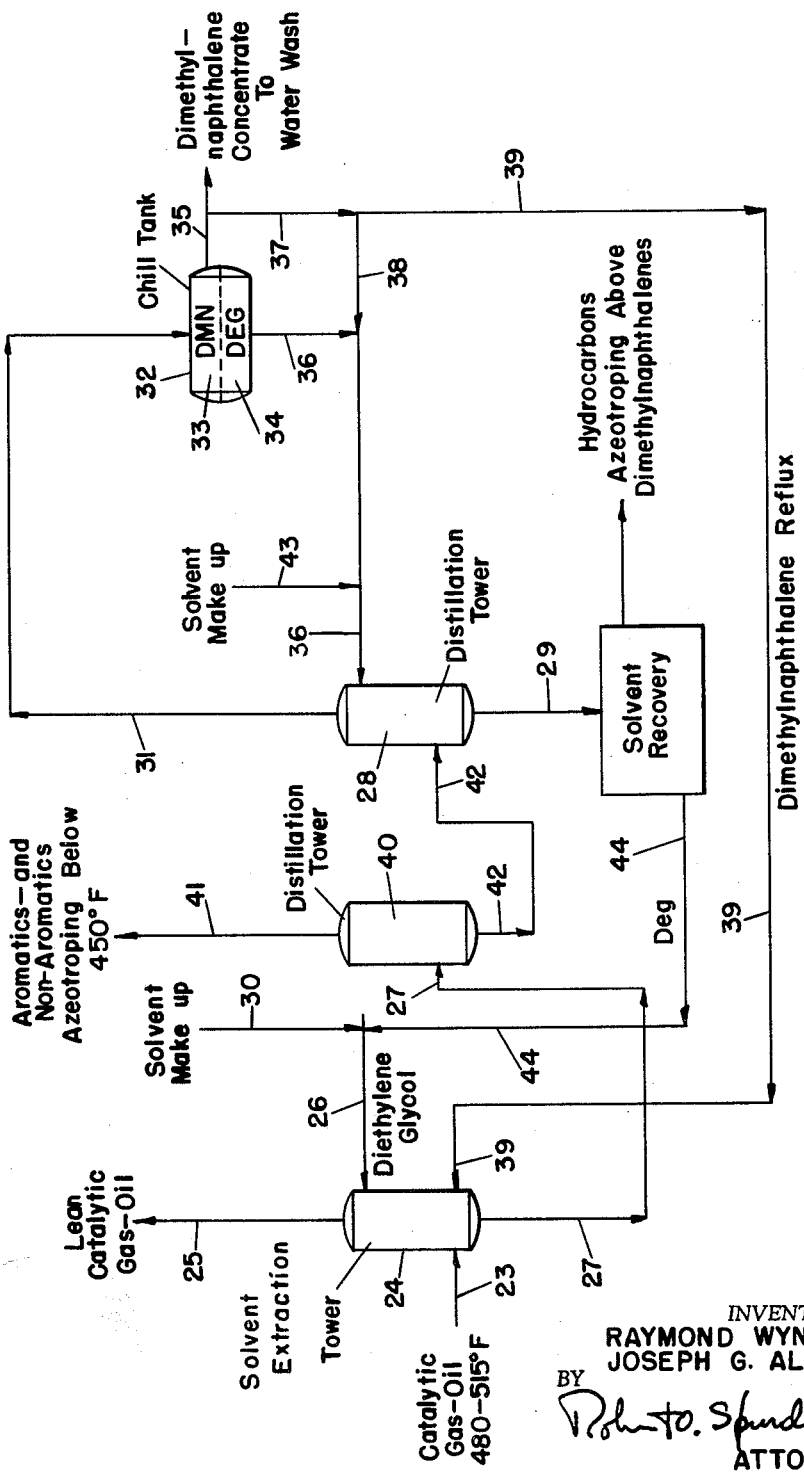
FIGURE 1 is a diagrammatic representation for one manner of practicing the present invention.

Reference is now made to the accompanying FIGURE 1 which is a schematic flowsheet showing the principal apparatus for practicing one embodiment of the present invention.

The feedstock, hereinbefore described, is charged through line 23 into solvent extraction tower 24 at a temperature of about 275° F. The aqueous solvent, say, diethylene glycol containing about 2% water, is charged to the tower 24 through line 26. From line 25 is removed the predominately non-aromatic raffinate stream and the extract, enriched in dimethylnaphthalenes, is removed via line 27. Thus, the gas oil feed flows countercurrent to the diethylene glycol. In order to enhance the selectivity of the solvent for dimethylnaphthalenes and for aromatic hydrocarbons generally, a reflux stream of dimethylnaphthalene concentrate is charged to the tower via line 39. Make-up solvent may be added to the extraction zone through line 30.

The extract enters distillation tower 40 wherefrom hydrocarbons which azeotrope below about 450° F. are removed via line 41. The heavier aromatic fraction comprising essentially concentrated dimethylnaphthalene plus the solvent is passed from tower 40 through line 42 into azeotropic distillation tower 28. The dimethylnaphthalene-DEG azeotrope which distills beginning at about 451° F. and ending at about 454° F. is removed via line 21. In this boiling range the DMN components are mainly the 2,6- and 2,7-isomers. If it is desired to obtain a dimethylnaphthalene product also containing the other isomers, the boiling range can be broadened to 448–460° F. Suitable reflux is returned through line 36 to control the reflux ratio between about 2 and 30. Preferably the reflux ratio will be from about 3:1 to 5:1. It has been found that the composition of the DEG–DMN azeotrope in line 31 is 58% by weight DEG and 42% by weight DMN. The residuum aromatic hydrocarbons distilling above about, say, 454° F. are removed through line 29. In all cases, the DEG can be recovered and recycled to the process to effect economies in the operation.

The DEG-DMN azeotrope removed through line 31 can be further processed, such as by cooling to less than 100° F., in order to break the azeotrope into two phases, e.g., a DMN phase 33 and a DEG phase 34. The DMN is recovered by, say, decantation, from chill tank 32 and the recovered solvent is usually recycled to the process. Suitable reflux is added to tower 28 via line 36 and make-up solvent can be added through line 43.

A portion of the concentrate of 2,6- and 2,7-dimethylnaphthalene is recycled as reflux via line 39 to the extraction zone 24. A small portion of DMN concentrate is passed through line 38 and mixed with the separated DEG in line 36 in an amount sufficient to maintain the DEG–DMN azeotrope composition. The DMN product from line 35 can be further processed. For example, 2,6-DMN of 90+% purity can be recovered from the 2,7-DMN via fractional crystallization.

The following examples are cited to illustrate the features of the invention.

EXAMPLE I

The determination of the optimum extraction temperature was made by measuring the mutual solubilities of the various components. Presented below are data from the dimethylnaphthalene/diethylene glycol system and from the full boiling range catalytic gas oil/diethylene glycol system.

Table I.—Mutual solubility data for system diethylene glycol-dimethylnaphthalene[1]

| Temp., ° F. | Weight Percent Solubility | |
| --- | --- | --- |
| | DEG in DMN | DMN in DEG |
| 240 | 5.7 | 14.1 |
| 260 | 8.4 | 17.2 |
| 275 | 11.8 | 21.1 |
| 290 | 15.8 | 25.0 |
| 300 | 20.8 | 28.0 |
| 304 | 25.1 | 38.0 |
| 305 | 27.1 | |
| 306 | 29.9 | |
| 307 | 33.8 | |
| 308 | 47.6 | |

[1] The dimethylnaphthalene was prepared by azeotropic distillation of a 480–515° F., 100% aromatic fraction from CGO. GLPC analysis shows 23.3% non-DMN material.

Table II.—Mutual solubility data for system diethylene glycol—whole CGO[1]

| Temp., ° F. | Weight Percent Solubility | |
| --- | --- | --- |
| | DEG in CGO | CGO in DEG |
| 240 | 2.0 | 0.6 |
| 260 | 2.4 | 0.8 |
| 275 | 3.0 | 1.0 |
| 290 | 3.6 | 1.3 |
| 300 | 4.1 | 1.5 |
| 305 | 4.7 | 1.8 |

[1] Analysis of the gas oil shows about 40% aromatics and 5.3 weight percent dimethylnaphthalene.

Figure 2:
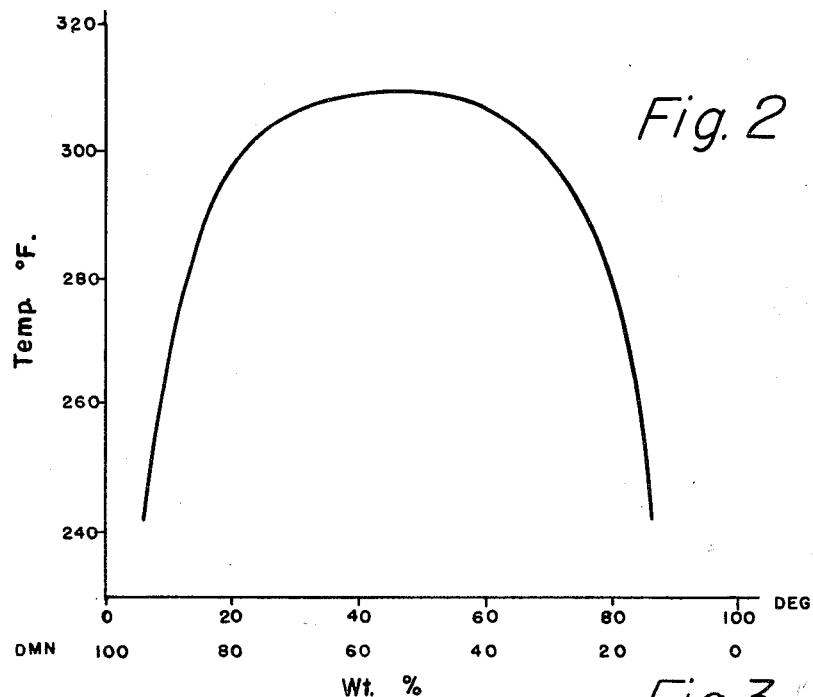
FIGURE 2 is a plot of mutual soluble data contained in Table I for the system diethylene glycol-dimethylnaphthalene.
Figure 3:
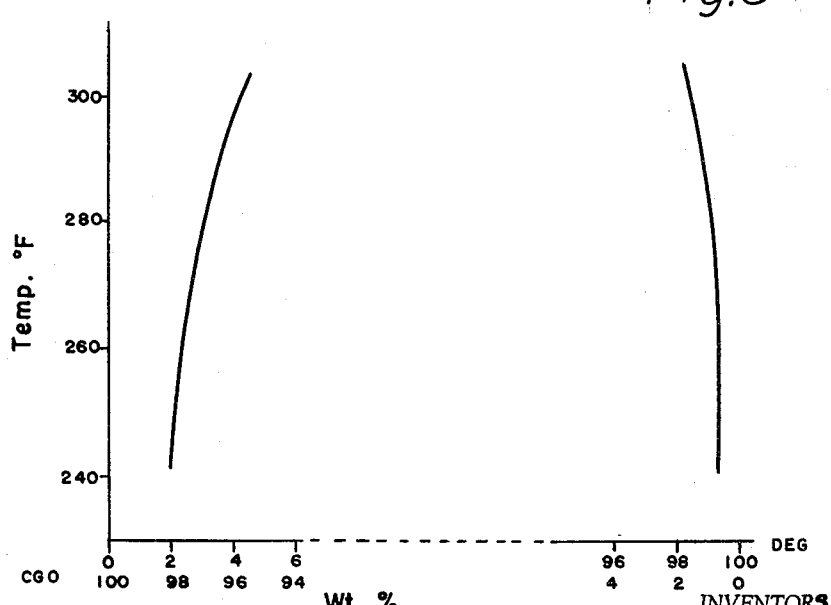
FIGURE 3 is a plot of the mutual solubility data contained in Table II for the system diethylene glycol-whole catalytic gas oil.

The above data are plotted in FIGURES 2 and 3. From the curves it is noted that 275° F. is a satisfactory operating temperature. The solubilities of DMN and DEG are high enough for practical processing and the solubilities of the CGO and DEG are low enough so as not to be competitive. In addition, the relative solubilities do not change materially with temperature in this portion of the curves.

EXAMPLE II

Once the operating temperature of 275° F. had been selected, mutual solubilities were run on various mixtures to determine the areas of single phase and two-phase composition on a conventional ternary diagram. Table III summarizes the results for the mixture catalytic gas oil/DMN/DEG.

*Table III.—Mutual solubility data for whole CGO/DMN/DEG system at 275° F.*

| Solute | Solvent | Wt. percent Solute in Solvent |
|---|---|---|
| DEG | 5.3% DMN/94.7% CGO | 2.8 |
| DEG | 23.3% DMN/76.7% CGO | 3.0 |
| DEG | 45.7% DMN/54.3% CGO | 5.0 |
| DEG | 68.7% DMN/31.3% CGO | 7.4 |
| DEG | 90.6% DMN/ 9.4% CGO | 15.0 |
| DEG | 100% 2,6-DMN | 18.0 |
| 5.3% DNM/94.7% CGO | DEG | 1.0 |
| 44.9% DMN/55.1% CGO | DEG | 6.1 |
| 58.7% DMN/41.3% CGO | DEG | 6.5 |
| 72.7% DMN/27.3% CGO | DEG | 7.9 |
| 85.5% DMN/14.5% CGO | DEG | 15.3 |
| 90.6% DMN/ 9.4% CGO | DEG | 26.4 |
| 100% 2,6-DMN | DEG | 27.0 |

A fraction boiling between 480–515° F. was distilled from the above whole catalytic gas oil and was admixed with dimethylnaphthalenes and diethylene glycol for mutual solubility studies. Table IV summarizes the results.

*Table IV.—Mutual solubility data for 480–515° F., CGO/DMN/DEG system at 275° F.*

| Solute | Solvent | Wt. percent Solute in Solvent |
|---|---|---|
| DEG | 47.7% DMN/52.3% CGO | 2.7 |
| DEG | 72.8% DMN/27.2% CGO | 7.8 |
| DEG | 90.6% DMN/ 9.4% CGO | 15.0 |
| DEG | 100% 2,6-DMN | 18.0 |
| 24.7% DMN/75.3% CGO | DEG | 0.8 |
| 46.2% DMN/53.8% CGO | DEG | 6.9 |
| 63.4% DMN/36.6% CGO | DEG | 7.3 |
| 81.9% DMN/18.1% CGO | DEG | 10.8 |
| 86.1% DMN/13.9% CGO | DEG | 16.9 |
| 90.6% DMN/ 9.4% CGO | DEG | 26.4 |
| 100% 2,6-DMN | DEG | 27.0 |

A fraction boiling between 480–515° F. was distilled from a residuum from thermally cracking a catalytic reformate and was admixed as above described for solubility studies. Table V summaries the results.

*Table V.—Mutual solubility data for 480–515° F. light aromatics fraction [1]/DMN/DEG system at 275° F.*

| Solute | Solvent | Wt. percent Solute in Solvent |
|---|---|---|
| DEG | 5.0% DMN/95.0% CGO | 4.6 |
| DEG | 13.8% DMN/86.2% CGO | 5.2 |
| DEG | 26.5% DMN/73.5% CGO | 6.0 |
| DEG | 47.8% DMN/51.2% CGO | 7.6 |
| DEG | 69.3% DMN/30.7% CGO | 9.9 |
| DEG | 90.6% DMN/9.4% CGO | 15.0 |
| DEG | 100% 2,6-DMN | 18.0 |
| 5.0% DMN/95.0% CGO | DEG | 5.6 |
| 26.5% DMN/73.5% CGO | DEG | 7.6 |
| 47.8% DMN/51.2% CGO | DEG | 10.2 |
| 69.3% DMN/30.7% CGO | DEG | 15.4 |
| 90.6% DMN/9.4% CGO | DEG | 26.4 |
| 100% 2,6-DMN | DEG | 27.0 |

[1] The sample was prepared by distilling a 480–515° F. fraction from light aromatic gas oil, then azeotropically distilling a DMN cut from it. The fraction, 100% aromatic, represents a 480–515° F. fraction minus the dimethylnaphthalenes. Actual analysis by GLPC shows about 5 Wt. percent DMNs.

EXAMPLE III

To obtain tie line data for each system three points were selected from within the two-phase region of the ternary diagram. Each sample was formulated according to the indicated point composition and placed in an appropriate apparatus. The sample was heated to 275° F. and allowed time to reach equilibrium. The raffinate and extract phases were separated and weighed. Weight ratios for each phase were calculated from the results.

The phases were analyzed first for diethylene glycol. The sample was then partitioned between water and pentane to remove the DEG. The pentane was stripped off and the hydrocarbon portion analyzed for dimethylnaphthalenes. Finally, a material balance was made between the compositions of the starting phase and the raffinate and extract phases.

Using all of the hereinabove data, the attached diagrams and following tables were constructed. The single conjugated line for interpolation of tie lines was plotted as recommended by Perry, Chemical Engineer's Handbook, 3rd edition, at page 724. The interpolated tie line data were used to calculate data for a Maloney and Schubert Solvent Content-Concentration Diagram and a Selectivity Diagram according to the method illustrated in Perry, supra, at pages 734–737. The minimum reflux ratio was determined for each system based on obtaining a DMN concentrate of about 85% (a concentration less than the solutrope concentration).

A. WHOLE CGO-DIMETHYLNAPHTHALENE-DIETHYLENE GLYCOL (1) Composition of components used in preparing the blends for miscibility and phase composition studies:

|  | CGO | DMN Concentrate |
|---|---|---|
| Wt. Percent DMN | 5.3 | 90.6 |
| Wt. Percent Gas oil | 94.7 | 9.4 |

Figure 4:
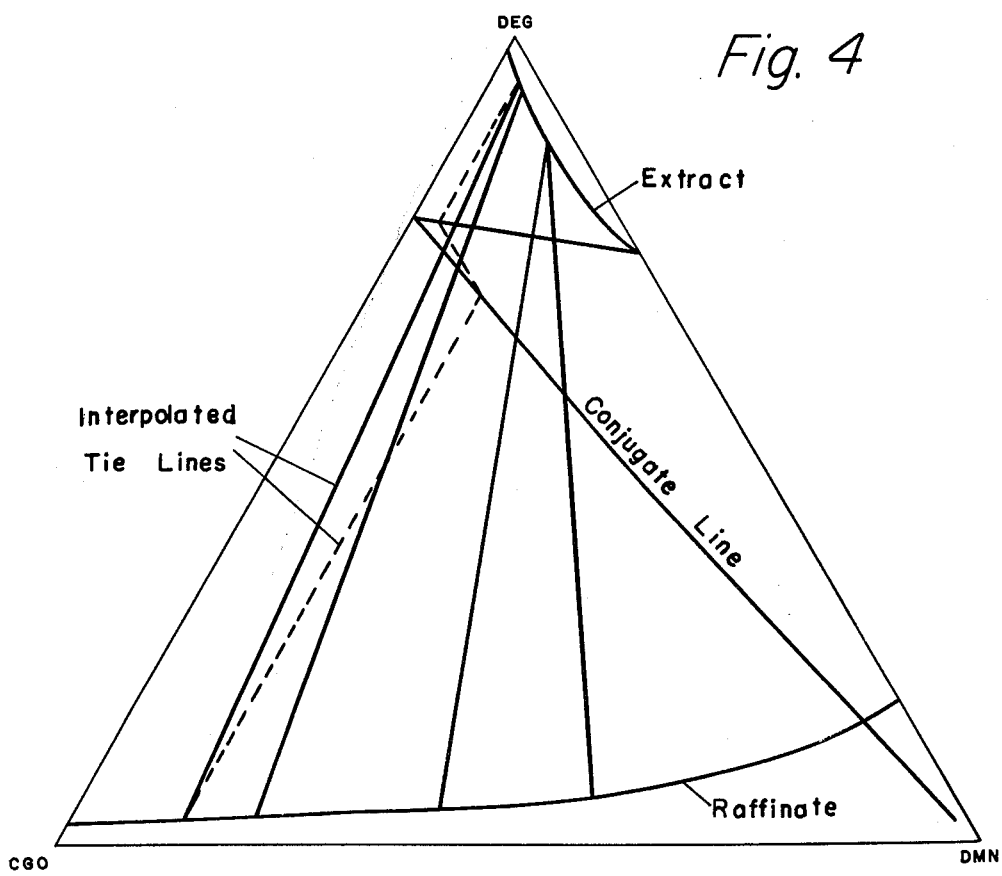
FIGURE 4 is a ternary diagram with conjugate line for the system whole catalytic gas oil-dimethylnaphthalene-diethylene glycol.

(2) FIGURE 4—Ternary Diagram with conjugate line for interpolation.
(3) FIGURE 5—Solvent Content versus Concentration and Selectivity Diagram for Whole CGO.
(4) Table VI—Summary of Phase Composition Data.
(5) Table VII—Analysis of Raffinate and Extract Phases.
(6) Table VIII—Data for construction of Selectivity Diagram and Solvent Content versus Concentration.
(7) Minimum Reflux Ratio—9 to 1.

*Table VI.—Summary of phase composition study of whole CGO/DMN/DEG system at 275° F.*

| Sample No. | Component | Weight Percent | | | Weight Percent, Solvent-Free Basis | | |
|---|---|---|---|---|---|---|---|
|  |  | P | R | E | P | R | E |
| 1 | DMN | 13.4 | 20.4 | 4.1 | 22.6 | 20.9 | 52.6 |
|  | DEG | 40.7 | 2.3 | 92.2 |  |  |  |
|  | CGO | 45.9 | 77.3 | 3.7 | 77.4 | 79.1 | 47.4 |
|  |  | 100.0 | 100.0 | 100.0 | 100.0 | 100.0 | 100.0 |
| 2 | DMN | 26.7 | 39.1 | 10.6 | 44.9 | 41.4 | 75.7 |
|  | DEG | 40.6 | 5.5 | 86.0 |  |  |  |
|  | CGO | 32.7 | 55.4 | 3.4 | 55.1 | 58.6 | 24.3 |
|  |  | 100.0 | 100.0 | 100.0 | 100.0 | 100.0 | 100.0 |
| 3 | DMN | 36.0 | 55.1 | 11.0 | 60.3 | 58.4 | 76.9 |
|  | DEG | 40.3 | 5.6 | 85.7 |  |  |  |
|  | CGO | 23.7 | 39.3 | 3.3 | 39.7 | 41.6 | 23.1 |
|  |  | 100.0 | 100.0 | 100.0 | 100.0 | 100.0 | 100.0 |

P = Composition of Starting Phase.
R = Composition of Raffinate Phase.
E = Composition of Extract Phase.

These data and the miscibility data on the following table were used in constructing the ternary diagram.

*Table VII.—Analysis of raffinate and extract phases from whole CGO/DMN/DEG system at 275° F.*

| Sample No. | Component | Raffinate | | Extract | | Totals Wt., gms. | Weight percent in— | |
|---|---|---|---|---|---|---|---|---|
| | | Wt., percent | Wt., gms. | Wt., percent | Wt., gms. | | Raffinate | Extract |
| 1 | DMN | 20.4 | 12.0 | 4.1 | 1.8 | 13.8 | | |
| | DEG | 2.3 | 1.4 | 92.2 | 40.3 | 41.7 | | |
| | CGO | 77.3 | 45.3 | 3.7 | 1.6 | 46.9 | | |
| | | 100.0 | 58.7 | 100.0 | 43.2 | 102.4 | 57.3 | 42.7 |
| 2 | DMN | 39.1 | 22.1 | 10.6 | 4.6 | 26.7 | | |
| | DEG | 5.5 | 3.1 | 86.0 | 37.5 | 40.6 | | |
| | CGO | 55.4 | 31.3 | 3.4 | 1.5 | 32.8 | | |
| | | 100.0 | 56.5 | 100.0 | 43.6 | 100.1 | 56.4 | 43.6 |
| 3 | DMN | 55.1 | 31.1 | 11.0 | 4.7 | 35.7 | | |
| | DEG | 5.6 | 3.2 | 85.7 | 36.7 | 39.9 | | |
| | CGO | 39.3 | 22.1 | 3.3 | 1.4 | 23.5 | | |
| | | 100.0 | 56.4 | 100.0 | 42.8 | 99.1 | 56.9 | 43.1 |

*Table VIII.—Data [1] for selectivity diagram and solvent content vs. concentration for whole CGO*

| Point No. | Extract Phase | | | Extract Phase Solvent-Free | | Raffinate Phase | | | Raff. Phase Solvent-Free | | #DEG/#HC | |
|---|---|---|---|---|---|---|---|---|---|---|---|---|
| | DEG | DMN | CGO | DMN | CGO | DEG | DMN | CGO | DMN | CGO | Extract | Raff. |
| 1 | 92.2 | 4.1 | 3.7 | 52.6 | 47.4 | 2.3 | 20.4 | 77.3 | 20.9 | 79.1 | 11.8 | .023 |
| 2 | 86.0 | 10.6 | 3.4 | 75.7 | 24.3 | 5.5 | 39.1 | 55.4 | 41.4 | 58.6 | 6.1 | .058 |
| 3 | 85.7 | 11.0 | 3.3 | 76.9 | 23.1 | 5.6 | 55.1 | 39.3 | 58.4 | 41.6 | 6.0 | .059 |
| 4 | 99.0 | | 1.0 | | 100 | 2.5 | | 97.5 | | 100 | 99.0 | .026 |
| 5 | 73.0 | 27.0 | | 100 | | 18.0 | 82.0 | | 100 | | 2.7 | .220 |
| "INTERPOLATED TIE LINE DATA" | | | | | | | | | | | | |
| 6 | 73.1 | 25.4 | 1.5 | 94.4 | 5.6 | 17.3 | 80.7 | 2.0 | 97.6 | 2.4 | 2.7 | .209 |
| 7 | 75.0 | 22.0 | 3.0 | 88.0 | 12.0 | 13.8 | 76.0 | 10.2 | 88.2 | 11.8 | 3.0 | .160 |
| 8 | 77.5 | 19.5 | 3.0 | 86.7 | 13.3 | 10.3 | 69.7 | 20.0 | 77.7 | 22.3 | 3.4 | .115 |
| 9 | 79.9 | 17.0 | 3.1 | 84.6 | 15.4 | 7.1 | 62.5 | 30.4 | 67.3 | 32.7 | 4.0 | .076 |
| 10 | 94.3 | 2.6 | 3.1 | 45.6 | 54.4 | 3.0 | 13.4 | 83.6 | 13.8 | 86.2 | 16.5 | .031 |
| 11 | 97.0 | 1.0 | 2.0 | 33.3 | 66.7 | 2.6 | 5.1 | 92.3 | 5.2 | 94.8 | 32.3 | .027 |

[1] All were weight percent.

B. 480–515° F.; CGO-DIMETHYLNAPHTHALENE-DIETHYLENE GLYCOL (1) 480–515° F. gas oil fraction was distilled from the whole gas oil at 50 theoretical plates and 50:1 reflux ratio.

Composition of components used in preparing the blends for miscibility and phase composition studies:

| | 480–515° F. CGO | DMN Concentrate |
|---|---|---|
| Wt. Percent DMN | 24.7 | 90.6 |
| Wt. Percent Gas Oil | 75.3 | 9.4 |

Figure 6:
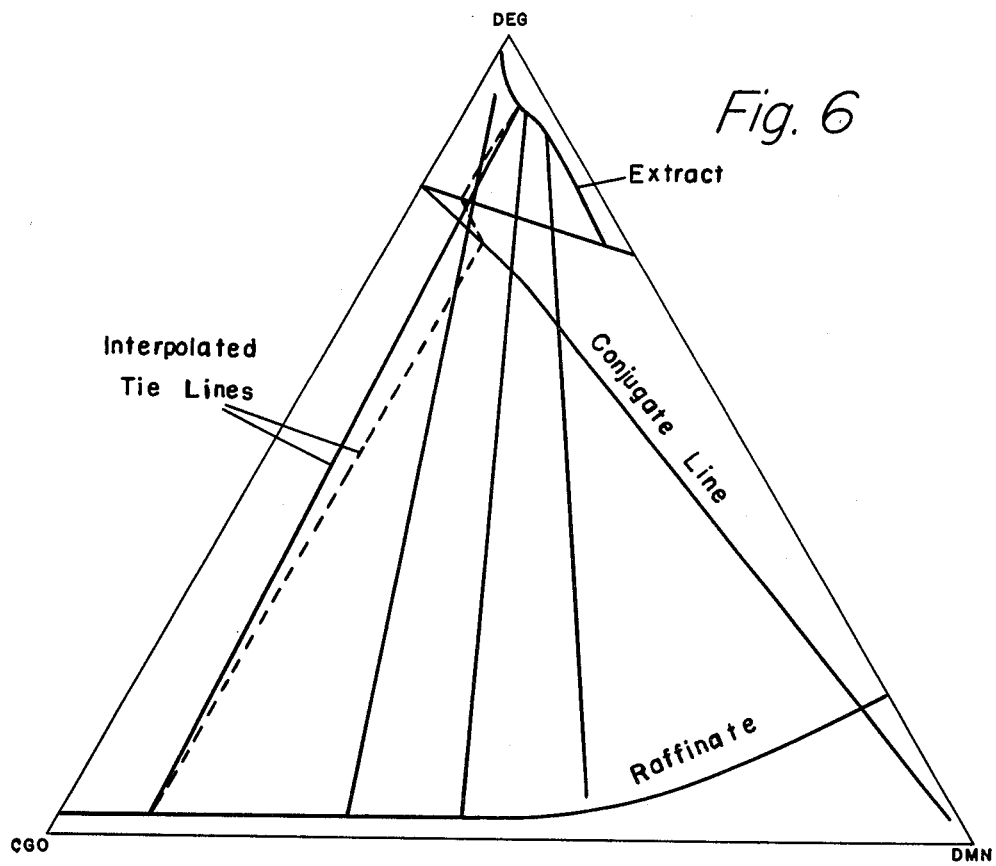
FIGURE 6 is a ternary diagram with conjugate line for the system 480°–515° F. catalytic gas oil-dimethylnaphthalene-diethylene glycol.

(2) FIGURE 6—Ternary Diagram with conjugate line for interpolation.
(3) FIGURE 7—Solvent Content versus Concentration and Selectivity Diagram for 480–515° F., CGO.
(4) TABLE IX—Summary of Phase Composition Data.
(5) TABLE X—Analysis of Raffinate and Extract Phases.
(6) TABLE XI—Data for construction of Selectivity Diagram and Solvent Content versus Concentration.
(7) Minimum Reflux Ratio—12 to 1.

*TABLE IX.—Summary of phase composition study of 480–515° F., CGO/DMN/DEG system at 275° F.*

| Sample No. | Component | Weight Percent | | | Weight Percent, Solvent-Free Basis | | |
|---|---|---|---|---|---|---|---|
| | | P | R | E | P | R | E |
| 1 | DMN | 19.4 | 31.6 | 2.2 | 32.3 | 32.4 | 31.9 |
| | DEG | 39.9 | 2.6 | 93.1 | | | |
| | CGO | 40.7 | 65.8 | 4.7 | 67.7 | 67.6 | 68.1 |
| | | 100.0 | 100.0 | 100.0 | 100.0 | 100.0 | 100.0 |
| 2 | DMN | 28.0 | 43.1 | 7.1 | 46.4 | 44.5 | 69.6 |
| | DEG | 39.7 | 3.2 | 89.9 | | | |
| | CGO | 32.2 | 53.7 | 3.1 | 53.6 | 55.5 | 30.4 |
| | | 100.0 | 100.0 | 100.0 | 100.0 | 100.0 | 100.0 |
| 3 | DMN | 36.8 | 55.9 | 9.9 | 61.0 | 59.0 | 85.3 |
| | DEG | 39.7 | 5.3 | 88.4 | | | |
| | CGO | 23.5 | 38.8 | 1.7 | 39.0 | 41.0 | 14.7 |
| | | 100.0 | 100.0 | 100.0 | 100.0 | 100.0 | 100.0 |

P=Composition of Starting Phase.
R=Composition of Raffinate Phase.
E=Composition of Extract Phase.

These data and miscibility data on the following table were used in constructing the ternary diagram.

TABLE X.—Analysis of raffinate and extract phases from 480–515° F., CGO/DMN/DEG system at 275° F.

| Sample No. | Component | Raffinate | | Extract | | Totals Wt., gms. | Weight percent in— | |
|---|---|---|---|---|---|---|---|---|
| | | Wt., percent | Wt., gms. | Wt., percent | Wt., gms. | | Raffinate | Extract |
| 1 | DMN | 31.6 | 18.3 | 2.2 | 0.9 | 19.2 | | |
| | DEG | 2.6 | 1.5 | 93.1 | 37.8 | 39.3 | | |
| | CGO | 65.8 | 38.1 | 4.7 | 1.9 | 40.0 | | |
| | | 100.0 | 57.9 | 100.0 | 40.6 | 98.5 | 58.8 | 41.2 |
| 2 | DMN | 43.1 | 25.1 | 7.1 | 3.0 | 28.1 | | |
| | DEG | 3.2 | 1.9 | 89.8 | 38.9 | 39.8 | | |
| | CGO | 53.7 | 31.2 | 3.1 | 1.3 | 32.5 | | |
| | | 100.0 | 58.2 | 100.0 | 42.2 | 100.4 | 58.0 | 42.0 |
| 3 | DMN | 55.9 | 32.7 | 9.9 | 4.1 | 36.8 | | |
| | DEG | 5.3 | 3.1 | 88.4 | 36.6 | 39.7 | | |
| | CGO | 38.8 | 22.7 | 1.7 | 0.7 | 23.4 | | |
| | | 100.0 | 58.5 | 100.0 | 41.4 | 99.9 | 58.6 | 41.4 |

TABLE XI.—Data[1] for selectivity diagram and solvent content vs. concentration for 480–515° F. CGO

| Point No. | Extract Phase | | | Extract Phase Solvent-Free | | Raffinate Phase | | | Raff. Phase Solvent-Free | | #DEG/#HC | |
|---|---|---|---|---|---|---|---|---|---|---|---|---|
| | DEG | DMN | CGO | DMN | CGO | DEG | DMN | CGO | DMN | CGO | Extract | Raff. |
| 1 | 93.1 | 2.2 | 4.7 | 31.9 | 68.1 | 2.6 | 31.6 | 65.8 | 32.4 | 67.6 | 13.5 | .0266 |
| 2 | 89.8 | 7.1 | 3.1 | 69.6 | 30.4 | 3.2 | 43.1 | 53.7 | 44.5 | 55.5 | 8.8 | .0330 |
| 3 | 88.4 | 9.9 | 1.7 | 85.3 | 14.7 | 5.3 | 55.9 | 38.8 | 59.0 | 41.0 | 7.6 | .0559 |
| 4 | 99.2 | | 0.8 | | 100 | 2.3 | | 97.7 | | 100 | 124.0 | .0235 |
| 5 | 73 | 27.0 | | 100 | | 18.0 | 82.0 | | 100 | | 2.7 | .220 |

"INTERPOLATED TIE LINE DATA"

| 6 | 97.0 | 0.5 | 2.5 | 16.7 | 83.3 | 2.4 | 9.9 | 87.7 | 10.1 | 89.9 | 32.3 | .0245 |
| 7 | 94.6 | 2.1 | 3.3 | 38.9 | 61.1 | 2.5 | 22.5 | 75.0 | 23.1 | 76.9 | 17.5 | .0256 |
| 8 | 86.0 | 11.9 | 2.1 | 85.0 | 15.0 | 6.0 | 64.0 | 30.0 | 68.1 | 31.9 | 6.1 | .0638 |
| 9 | 82.4 | 15.2 | 2.4 | 86.4 | 13.6 | 9.3 | 70.6 | 20.1 | 77.8 | 22.2 | 4.7 | .103 |
| 10 | 78.1 | 19.3 | 2.6 | 88.1 | 11.9 | 13.5 | 76.5 | 10.0 | 88.4 | 11.6 | 3.6 | .156 |
| 11 | 75.5 | 22.0 | 2.5 | 89.7 | 10.3 | 15.7 | 79.2 | 5.1 | 94.0 | 6.0 | 3.1 | .186 |
| 12 | 98.0 | 0.2 | 1.8 | 10.0 | 90.0 | 2.4 | 4.6 | 98.0 | 4.7 | 95.3 | 49.0 | .0245 |

[1] All are weight percent.

C. 480–515° F. LIGHT GAS OIL-DIMETHYLNAPHTHALENE-DIETHYLENE GLYCOL (1) The starting material is a plant distillate fraction boiling between 400–550° F. The 400–550° F. fraction was distilled at 50 theoretical plates and 50:1 reflux ratio into a 480–515° F. cut. This fraction was 100% aromatic and contained 51% dimethylnaphthalenes. The DMN concentrates used in all the studies were prepared by azeotropically distilling this fraction with diethylene glycol.

Composition of components used in preparing the blends for miscibility and phase composition studies:

| | 480–515° F. Gas Oil | DMN Concentrate |
|---|---|---|
| Wt. percent DMN | 5.0 | 90.6 |
| Wt. percent Gas Oil | 95.0 | 9.4 |

Figure 8:
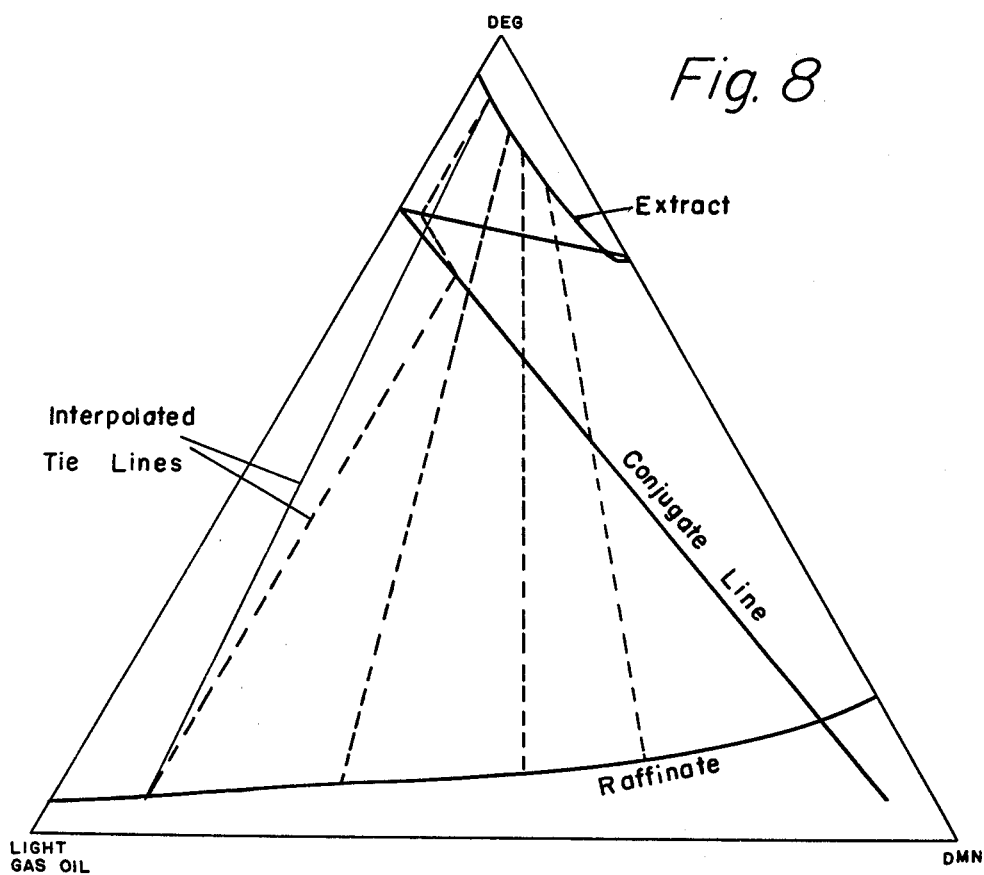
FIGURE 8 is a ternary diagram with conjugate line for the system light gas oil-dimethylnaphthalene-diethylene glycol.
Figure 9:
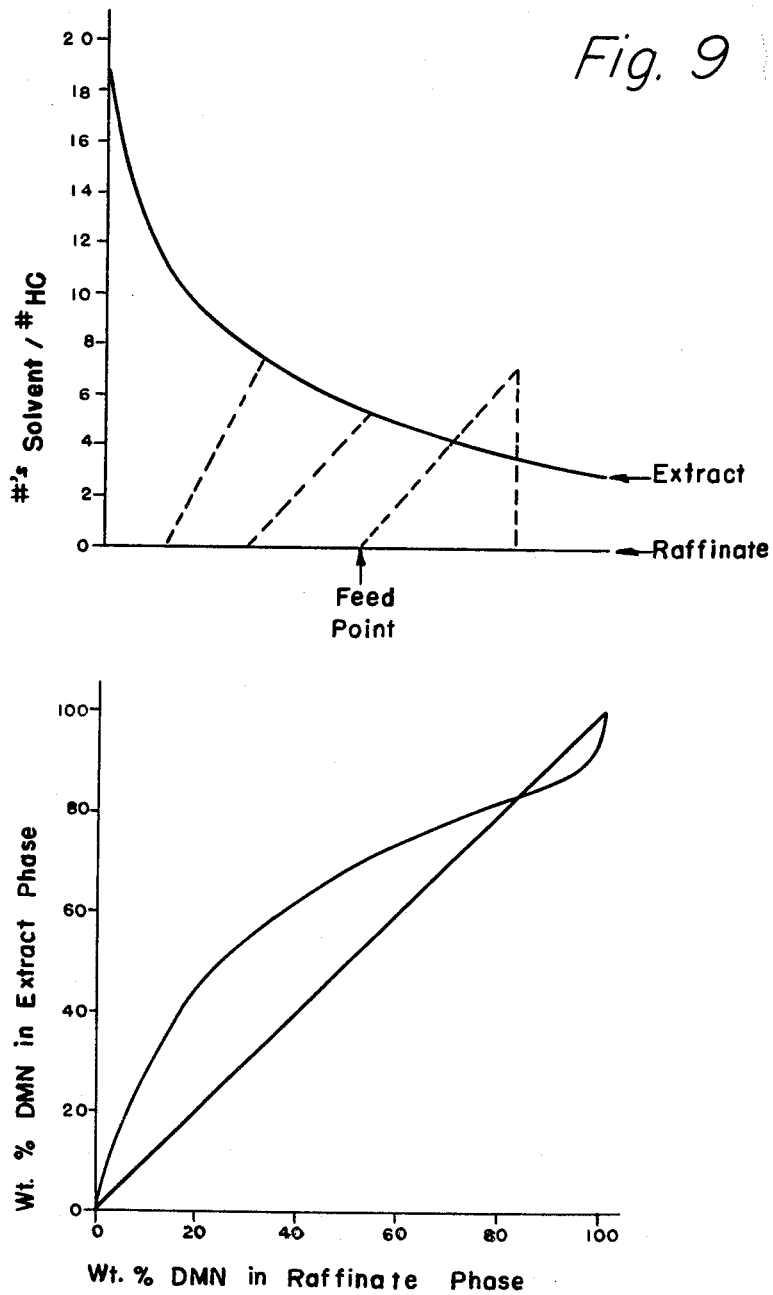
FIGURE 9 is a plot of solvent content vs. concentration of the ternary system light gas oil-dimethylnaphthalene-diethylene glycol. Also plotted as FIGURE 9 is a selectivity diagram of a light gas oil fraction in this ternary system.

(2) FIGURE 8—Ternary diagram with conjugate line for interpolation.
(3) FIGURE 9—Solvent Content versus Concentration and in Selectivity Diagram for 480–515° F. light gas oil.
(4) TABLE XII—Summary of Phase Composition Data.
(5) TABLE XIII—Analysis of Raffinate and Extract Phases.
(6) TABLE XIV—Data for Construction of Selectivity Diagram and Solvent Content versus Concentration.
(7) Minimum Reflux Ratio 51% DMN in charge, 1 to 1.

Table XII.—Summary of phase composition study of 480–515° F. light gas oil/DMN/DEG system at 275° F.

| Sample No. | Component | Weight Percent | | | Weight Percent, Solvent-Free Basis | | |
|---|---|---|---|---|---|---|---|
| | | P | R | E | P | R | E |
| 1 | DMN | 32.9 | 48.9 | 10.3 | 54.8 | 53.0 | 67.3 |
| | DEG | 40.0 | 7.8 | 84.7 | | | |
| | CGO | 27.1 | 43.3 | 5.0 | 45.2 | 47.0 | 32.7 |
| | | 100.0 | 100.0 | 100.0 | 100.0 | 100.0 | 100.0 |
| 2 | DMN | 20.1 | 29.6 | 6.7 | 33.4 | 31.6 | 56.8 |
| | DEG | 39.9 | 6.4 | 88.2 | | | |
| | CGO | 40.0 | 64.0 | 5.1 | 66.6 | 68.4 | 43.2 |
| | | 100.0 | 100.0 | 100.0 | 100.0 | 100.0 | 100.0 |
| 3 | DMN | 41.5 | 61.5 | 15.0 | 69.2 | 68.2 | 76.5 |
| | DEG | 40.0 | 9.8 | 80.4 | | | |
| | CGO | 18.5 | 28.7 | 4.6 | 30.8 | 31.8 | 23.5 |
| | | 100.0 | 100.0 | 100.0 | 100.0 | 100.0 | 100.0 |

P = Composition of Starting Phase.
R = Composition of Raffinate Phase.
E = Composition of Extract Phase.

*Table XIII.—Analysis of raffinate and extract phases from 480–515° F. light gas oil/DMN/DEG system at 275° F.*

| Sample No. | Component | Raffinate Wt., percent | Raffinate Wt., gms. | Extract Wt., percent | Extract Wt., gms. | Totals Wt., gms. | Weight percent in— Raffinate | Weight percent in— Extract |
|---|---|---|---|---|---|---|---|---|
| 1 | DMN | 48.9 | 28.2 | 10.3 | 4.4 | 32.6 | | |
|   | DEG | 7.8 | 4.4 | 84.7 | 35.2 | 39.6 | | |
|   | CGO | 43.3 | 24.8 | 5.0 | 2.0 | 26.8 | | |
|   |     | 100.0 | 47.4 | 100.0 | 41.6 | 99.0 | 58.0 | 42.0 |
| 2 | DMN | 29.6 | 17.2 | 6.7 | 2.7 | 19.9 | | |
|   | DEG | 6.4 | 3.6 | 88.2 | 35.9 | 39.5 | | |
|   | CGO | 64.0 | 37.3 | 5.1 | 2.2 | 39.5 | | |
|   |     | 100.0 | 58.1 | 100.0 | 40.8 | 98.9 | 58.7 | 41.3 |
| 3 | DMN | 61.5 | 35.0 | 15.0 | 6.1 | 41.1 | | |
|   | DEG | 9.8 | 5.6 | 80.4 | 34.0 | 39.6 | | |
|   | CGO | 28.7 | 16.3 | 4.6 | 2.0 | 18.3 | | |
|   |     | 100.0 | 56.9 | 100.0 | 42.1 | 99.0 | 57.4 | 42.6 |

*Table XIV.—Data [1] for selectivity diagram and solvent content vs. concentration for 480–515° F. light gas oil*

| Point No. | Extract Phase DEG | Extract Phase DMN | Extract Phase CGO | Extract Phase Solvent-Free DMN | Extract Phase Solvent-Free CGO | Raffinate Phase DEG | Raffinate Phase DMN | Raffinate Phase CGO | Raff. Phase Solvent-Free DMN | Raff. Phase Solvent-Free CGO | #'s Solv./#HC Extract | #'s Solv./#HC Raff. |
|---|---|---|---|---|---|---|---|---|---|---|---|---|
| 1 | 84.7 | 10.3 | 5.0 | 67.3 | 32.7 | 7.8 | 48.9 | 43.3 | 53.0 | 47.0 | 5.5 | .084 |
| 2 | 88.2 | 6.7 | 5.1 | 56.8 | 43.2 | 6.4 | 29.6 | 64.0 | 31.6 | 68.4 | 7.5 | .068 |
| 3 | 80.4 | 15.0 | 4.6 | 76.5 | 23.5 | 9.8 | 61.5 | 28.7 | 68.2 | 31.8 | 4.1 | .108 |
| 4 | 94.0 |  | 5.0 |  | 100.0 | 4.1 |  | 95.9 |  | 100.0 | 19.0 | .042 |
| 5 | 73.0 | 27.0 | 0.0 | 100.0 |  | 18.0 | 82.0 |  | 100.0 |  | 2.7 | .219 |
| | | | | | "INTERPOLATED TIE LINE DATA" | | | | | | | |
| 6 | 92.9 | 2.0 | 5.1 | 28.2 | 71.8 | 5.0 | 10.0 | 85.0 | 10.5 | 89.5 | 13.1 | .052 |
| 7 | 89.9 | 4.8 | 5.3 | 47.5 | 52.5 | 5.8 | 20.0 | 74.2 | 21.2 | 78.8 | 8.9 | .061 |
| 8 | 86.0 | 9.0 | 5.0 | 64.3 | 35.7 | 7.0 | 39.0 | 54.0 | 41.9 | 58.1 | 6.1 | .075 |
| 9 | 81.6 | 13.7 | 4.7 | 74.5 | 25.5 | 8.5 | 54.2 | 37.3 | 59.2 | 40.8 | 4.4 | .092 |
| 10 | 78.2 | 17.8 | 4.0 | 81.7 | 18.3 | 11.0 | 66.5 | 22.5 | 74.7 | 25.3 | 3.6 | .123 |
| 11 | 76.5 | 19.8 | 3.7 | 84.3 | 15.7 | 12.8 | 72.7 | 15.0 | 82.8 | 17.2 | 3.3 | .146 |
| 12 | 74.2 | 23.0 | 2.8 | 89.1 | 10.9 | 16.9 | 80.6 | 2.5 | 97.0 | 3.0 | 2.9 | .203 |

[1] All are weight percent.

Thus, from the above data, it is concluded that the polyalkylene glycols, as exemplified by diethylene glycol, show selectivity for dimethylnaphthalenes in an extraction process.

According to the invention, the extract phase containing the dimethylnaphthalene concentrate in the solvent is further processed in an azeotropic distillation step. As an illustration, the following example is cited.

EXAMPLE IV

1st distillation step (tower 40): Parts
Charge—
  33 parts DMN concentrate.
  67 parts of DEG containing 2% water.
Products—
  Non-aromatic and other hydrocarbons overhead _____ 23
  DEG overhead _____ 42
  DMN overhead _____ 1
  $C_{12}$ aromatic bottoms _____ 10
  DEG bottoms _____ 25
Azeotropic distillation step (tower 28):
Charge—
  10 parts $C_{12}$ aromatics.
  25 parts DEG.
Products—
  Overhead DMN's (451–454° F.) _____ 8
  DEG overhead _____ 10
  Bottom hydrocarbons _____ 2
  DEG bottoms _____ 15

At a temperature between 451–454° F. the 8 parts of DMN in the azeotrope contain substantially all of the 2,6- and 2,7-dimethylnaphthalenes in equilibrium proportion.

The following example illustrates a further characteristic of charge stock composition for practicing this invention:

EXAMPLE V

A series of catalytically cracked gas oils were fractionated into 480–515° F. boiling range cuts. These cuts were each azeotropically distilled with diethylene glycol with the following results:

| Wt. Percent Total Aromatics in 480–515° F. Cut | Wt. Percent Azeotrope Distillation Wt. Percent DMN in init.–448° F. Cut | Wt. Percent Azeotrope Distillation Wt. Percent DMN in 448–460° F. Cut |
|---|---|---|
| 27 | 88 | 12 |
| 40 | 69 | 31 |
| 60 | 33 | 67 |
| 100 | 0.7 | 99.3 |

Therefore, from the above data, it is concluded that at least 40% total aromatics are needed in the feed material, preferably, at least 60% aromatics, before a significant concentration of dimethylnaphthalenes appears in the azeotrope. Further, it has been found that the dimethylnaphthalene concentrate will contain an equilibrium mixture composed of most of the DMN isomers if the azeotrope is removed over a temperature range of 448° F. to 460° F. On the other hand, it has been found that the 2,6- and 2,7-isomers are the major product at 452° F. but are essentially absent from the product when the temperature reaches 454° F.

We claim:

1. A process for recovering an aromatic concentrate composed of 2,6- and 2,7-dimethylnaphthalenes from cracked gas oil containing 2,6- and 2,7-dimethylnaphthalenes, which comprises contacting at a temperature between 240° F. and 320° F. in an extraction zone cracked gas oil feed containing dimethylnaphthalenes and boiling substantially within the range of 400–650° F. with a polyalkylene glycol solvent which is selective for aromatics and which is a selective azeotrope former with dialkylnaphthalenes; separating a raffinate phase rich in non-aromatic hydrocarbons and an extract phase enriched in dimethylnaphthalenes; subjecting the extract phase to azeotropic distillation; removing an overhead fraction consisting essentially of dimethylnaphthalenes and solvent; recovering 2,6- and 2,7-dimethylnaphthalenes from the solvent; and removing a bottoms fraction consisting essentially of solvent and aromatics which azeotrope above said dimethylnaphthalenes.

2. A process according to claim 1 wherein a portion of the recovered dimethylnaphthalenes are recycled as reflux to the extraction zone at a locus intermediate the feed and extract.

3. A process according to claim 2 wherein said solvent is diethylene glycol.

4. A process according to claim 3 wherein said solvent contains from 0.25% to 20% water.

5. A process according to claim 1 wherein said extract phase contains at least 40% total aromatic hydrocarbons in the extract contained therein.

6. A process according to claim 5 wherein said overhead fraction is removed at a temperature between 448° F. and 460° F.

7. A process according to claim 6 wherein a portion of the separated dimethylnaphthalenes are recycled as reflux to the extraction zone at a locus intermediate the feed and extract.

8. A process for recovering an aromatic concentrate composed of 2,6- and 2,7-dimethylnaphthalenes from catalytic gas oil containing 2,6- and 2,7-dimethylnaphthalene which comprises distilling said gas oil to obtain a hydrocarbon fraction boiling within the range of 480° F. to 515° F.; contacting said fraction in an extraction zone at a temperature between 260° F. and 310° F. with aqueous diethylene glycol solvent; separating a raffinate phase rich in non-aromatic hydrocarbons and extract phase enriched in dimethylnaphthalenes and containing at least 60% total aromatic hydrocarbons in the extract contained therein; subjecting the extract phase to fractionation; removing the hydrocarbons azeotroping below 450° F.; removing a bottoms product containing solvent; subjecting the product to azeotropic distillation; removing overhead a hydrocarbon-solvent mixture azeotroping between 451° F. and 454° F.; cooling said azeotropic mixture to break the mixture into a solvent phase and a 2,6- and 2,7-dimethylnaphthalene phase; recovering said dimethylnaphthalenes from the solvent; removing a residuum distilling above 454° F.; and recycling a portion of the separated dimethylnaphthalenes to the extraction zone at a locus intermediate said fraction and extract.

9. A process according to claim 8 wherein said solvent contains from 0.25% to 10% water.

References Cited in the file of this patent

UNITED STATES PATENTS 2,909,576     Fenske et al. _____ Oct. 20, 1959

FOREIGN PATENTS 668,853     Great Britain _____ Mar. 26, 1952
823,902     Great Britain _____ Nov. 18, 1959